United States Patent [19]

Malizewski

[11] Patent Number: 5,964,870
[45] Date of Patent: Oct. 12, 1999

[54] METHOD AND APPARATUS FOR USING FUNCTION CONTEXT TO IMPROVE BRANCH

[75] Inventor: Richard Malizewski, Gresham, Oreg.

[73] Assignee: Intel Corporation, Santa Clara, Calif.

[21] Appl. No.: 08/934,964

[22] Filed: Sep. 22, 1997

[51] Int. Cl.[6] .................................................. G06F 9/38
[52] U.S. Cl. ........................ 712/240; 712/238; 712/239
[58] Field of Search .................................... 395/587, 586; 712/239, 240, 238

[56] References Cited

U.S. PATENT DOCUMENTS

| | | | |
|---|---|---|---|
| 4,860,199 | 8/1989 | Langendorf et al. | |
| 5,623,614 | 4/1997 | Van Dyke et al. | 395/587 |
| 5,758,142 | 5/1998 | McFarling et al. | 395/586 |
| 5,850,543 | 12/1998 | Shiell et al. | 712/238 |

OTHER PUBLICATIONS

Mike Jonhson, *Superscalar Microprocessor Design*, ISMN 0–3–875634–1, Prentice ©1991, pp. 57–55.

Seung II Sohn, *An Implementation of Branch Target Buffer For High Performance Applications*, Dept. of Electronic Eng., Yonsi University Seoul 120–749, Korea, ©1995 IEEE, pp. 492–495.

Chang et al., "Improving Branch Prediction Accuracy by Reducing Pattern History Table Interference", *Proceedings of the the 1996 Coformed o Parallel Architectires and Compliation Techiques*, IEEE, pp. 48–57.

Hilly et al., "Branch Prodictio ad Stimultaneous Multithreading", *Proceedings of the 1996 Confernce on Parallel Architectures and Compilation Techniques*, IEEE, pp. 169–173 Oct. 20–23, 1996.

Yeh et al., "A Comprehensive Instruction Fetch Mechanism for a Processor Supporitng Speculative Execution", *Proceedings of the 25th Annual International Symposium on Microarchitecture, 1992, Micro 25*, IEEE, pp. 129–139, Dec. 1–4, 1992.

Primary Examiner—William M. Treat
Attorney, Agent, or Firm—Blakely, Sokoloff, Taylor & Zafman

[57] ABSTRACT

An apparatus for predicting branch behavior during execution of branch instructions in a computer program. The apparatus comprises a branch table buffer (BTB) to store a plurality of branch addresses that are each generated during a function call and a plurality of branch histories associated with the branch addresses, the branch histories indicating whether or not an associated branch was previously taken. The apparatus further comprises circuitry coupled to the BTB to generate an index into the BTB using at least one level of context of the function call.

20 Claims, 4 Drawing Sheets

METHOD AND APPARATUS FOR USING FUNCTION CONTEXT TO IMPROVE BRANCH

FIELD OF THE INVENTION

The present invention is in the field of improving branch prediction in computer systems that execute application programs including branch instructions.

BACKGROUND OF THE INVENTION

A computer program executing on a computer system usually includes branch instructions, or branches. A conditional branch directs that one of two or more instructions or sets of instructions be executed dependent upon some condition or conditions being met. An unconditional branch directs that a certain instruction or set of instructions always be executed whenever the branch is encountered. Because time and hardware usage is involved in resolving a branch, that is, determining which of the available possible branches will be taken, it is known practice to attempt to predict branch behavior so that overhead associated with resolving branches can be reduced.

Current branch prediction methods do not always predict the actual branch behaviors, so some mispredictions inevitably occur. Typically, the performance penalty for a branch misprediction is greater than the overhead associated with executing the branch without attempting to predict branch behavior. This is particularly true in modern, pipelined processors. As such processors become faster, pipelines become correspondingly deeper so that a greater number of instructions are in flight at any given time. In the case of a branch misprediction, the deep pipeline, which is filled with incorrect instructions, typically must be completely flushed. Given a pipeline with a depth of seven cycles (where depth is the number of cycles from the start of an instruction execution to the end of instruction execution) a penalty of fifteen cycles could be incurred for a misprediction. This includes a minimum penalty of seven cycles for the depth of the pipeline with additional cycles necessary to save and restore relevant processor states.

Methods that do not involve branch prediction have also been used to attempt to reduce the overhead associated with branch instructions. One such method is scheduling branch delays. In this method the delays associated with executing a branch instruction are simply filled with other instructions to be executed in the interim. As processors become faster and pipelines deeper, however, branch delays become longer and the amount of code required to schedule sufficient activity to fill the delay becomes prohibitive.

Another method used to attempt to reduce branch delay is that of annotating instructions in the instruction cache. In this method, information constituting hints about branch behavior is annotated in a cache that stores instructions. Such hints include: successor block and/or line information; whether or not there is a branch in the line; any potential for misprediction; and if there is a branch in the line, where the branch went on the previous execution. The instruction cache annotation method creates a direct record of branch behavior and is costly in terms of hardware. Another disadvantage of this method is that, although it is fairly successful in the case of rhythmic behavior, it is not appreciably successful when application program behavior is relatively unpredictable.

Branch target buffers (BTBs) are small storage devices used in another technique of predicting branch behavior. BTBs are essentially small storage tables that store full branch addresses and, for each full branch address, a history of associated branch behavior that is collected over time where history indicates whether a branch was taken or not taken in the past. In the ideal case each time a branch is encountered in the execution of a program the full branch address would be stored in the BTB along with the associated history. Ideally, a BTB of unlimited size stores an unlimited number of branch addresses and upon each subsequent encounter with a particular branch the branch history is used to predict branch behavior. In reality, however, it is typically not economically feasible to devote enough hardware to a BTB to achieve this ideal case. Therefore, typical BTBs store approximately sixty-four (64) branch addresses with their associated histories. Because a finite number of branch addresses are stored at one time, branch addresses are displaced over time and may not always be found in the BTB.

An index into a BTB is typically generated by using a certain number of bits of the branch address as the index. When a branch is encountered in execution of the application program, the index is used as a lookup into the BTB in an attempt to find the branch address corresponding to the application program branch. This results in a many-to-one relationship between BTB entries and BTB indices. For this reason, one of the problems experienced with typical BTBs is that of address collision. Address collision occurs when a branch address encountered in the application program has an index belonging to both the branch address itself and another branch address previously stored in the BTB. In the case of a collision, although the lookup operation is successful, the subsequent comparison of the actual program branch address with the branch address stored in the BTB reveals that a collision has occurred and the associated history stored in the BTB is not the desired history. Another problem encountered in the use of typical BTBs is that of branch context collision. Context as used herein means the address that a current function was called from In the case of context collision, although the comparison of the branch address of the program with the branch address in the BTB reveals a match, the history in the BTB is inappropriate. Context collision can occur because more than one line of the application program may utilize a single branch address where each context's use of the branch address has a different behavior. Table 1 illustrates this case.

TABLE 1

```
        foo(){
        " " "
        " " "
line 23  goo(value 1); /* this call returns to next line, address
         0x1234*/
         " " "
         " " "
line 33  goo(value 2); /* this cell returns to next line, address
         0x2348*/
         " " "
         " " "
         }
         goo(VARIABLE){
         " " "
         " " "
         if(value 1){/* mispredicted branch */
                    /* address 0x4560 */
         " " "
         " " "
         } else {
         " " "
         " " "
              }
         }
```

Table 1 shows pseudocode describing the function foo( ). In the example of Table 1, function foo( ) call function goo( ) from lines 23 and 33 with return addresses 0x1234 and 0x2348, respectively, where "0x" denotes a hexadecimal number. The call that returns to 0x1234 is thirty percent of all calls to goo( ). The call that returns to 0x2348 is seventy percent of all calls to goo( ). The call described at line 23 calls with arguments/context that require the first branch in goo( ), at 0x4560, to be taken. The call described at line 33 calls with arguments/context that require the first branch in goo( ) to be not taken. If the goo( ) branch is predicted based solely upon bits from the branch address, as in the usual method this branch is likely to be mispredicted, as both of the differing behaviors have to be recorded and reconciled in the history portion of the BTB.

As shown in Table 1, seventy percent of calls to goo( ) will pass value 2 as VARIABLE. As shown, if VARIABLE is not value 1 the branch is mispredicted. In this example, context collision will occur seventy percent of the time.

Another possible situation that occurs with the use of a BTB is that of a lookup miss. In the case of a lookup miss, the index does not look up any entry in the BTB. Various alternate schemes are typically used in such a case, for example, always assuming that the branch will be taken. Lookup misses and their context collisions both cause performance degradation, however, for most processors context collisions are significantly more costly in terms of performance degradation than are lookup misses. This is because in the case of a lookup miss, the instruction prompting the lookup is typically not executed until the data sought in the lookup is actually found. Therefore, in the case of a lookup miss, the pipeline is not filled with data that later needs to be flushed. In the case of a misprediction, on the other hand, instructions are executed with inappropriate data, making it necessary to flush a potentially deep pipeline and restore previous processor states before reexecuting with appropriate data.

Another conventional method that can be used in combination with a BTB is inlining of functions. In the case of inlining, complete copies of the function code, for instance, the code for function foo( ) as shown in Table 1, are copied into the main body of the application program each time the function occurs. Therefore, the overhead associated with calling a function is reduced. Another affect of inlining is that one occurrence of a function in a particular section of code will have a different branch address from another occurrence of the function in another section of the code. By distributing copies of the function (and thus, copies of the branch) to the different contexts from which it was called, the branches can be predicted separately and in many cases more accurately. For this reason context collision as described above with respect to Table 1 may be reduced. Commonly, however, inlining is prohibitively costly because of the percentage of growth of the application code resulting from insertion of complete functions in place of function calls. Another disadvantage of inlining is that it requires special compilation or source manipulation by a user program. Also, if a poorly predicted branch resides in a precompiled library, this approach may be impossible.

SUMMARY OF THE INVENTION

An apparatus for predicting branch behavior during execution of branch instructions in a computer program is described. The apparatus comprises a branch table buffer (BTB) to store a plurality of branch addresses that are each generated during a function call and a plurality of branch histories associated with the branch addresses, the branch histories indicating whether or not an associated branch was previously taken. The apparatus further comprises circuitry coupled to the BTB to generate an index into the BTB using at least one level of context of the function call.

DETAILED DESCRIPTION

In the following detailed description of the present invention, numerous specific details are set forth in order to provide a thorough understanding of the present invention. However, it will be apparent to one skilled in the art that the present invention may be practiced without these specific details. In other instances well known methods, procedures, components, and circuits have not been described in detail to avoid obscuring the description of the present invention.

A method and apparatus for improving branch prediction is described. Bits from both the branch address whose performance is to be predicted and a current return address are used to generate an index into a branch table buffer (BTB) that stores branch addresses and associated histories. Accordingly, different occurrences of a single branch are effectively treated as different branches for prediction purposes based on differing return addresses. The present method and apparatus requires ho recompilation to achieve improvement in branch prediction. The present method and apparatus is effective for branches in proprietary library code. That is, according to the present invention, the code in which a branch is written does not need to be understood or changed. The present invention does not result in and does not result in greater program size that would require additional storage space.

Figure 1:
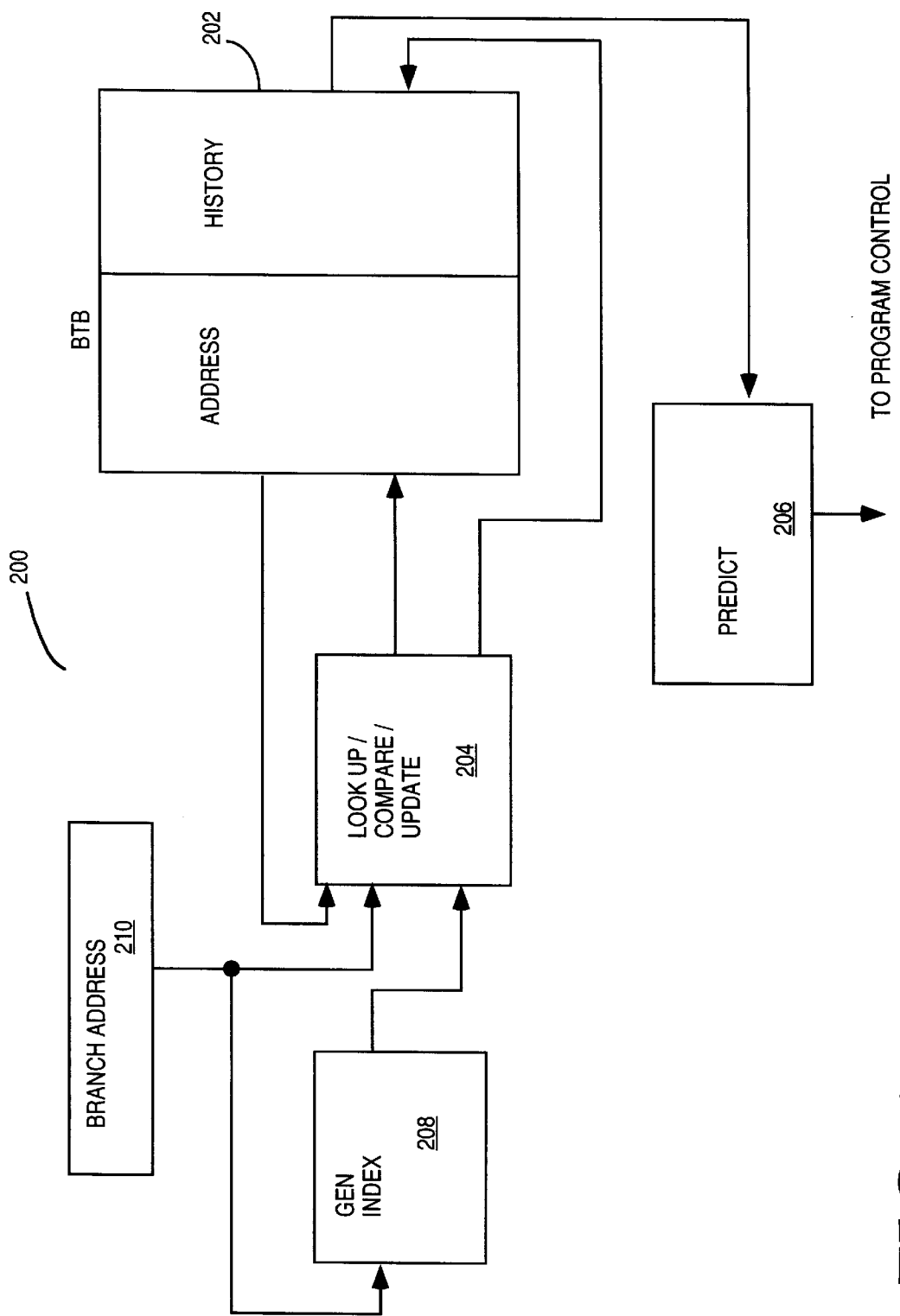
FIG. 1 is a block diagram of prior art circuitry for predicting branch behavior.

FIG. 1 is a block diagram of prior art circuitry 200 used for branch prediction in a computer system. BTB 202 is divided into an address section and a history section. The address section stores multiple, entire branch addresses. The history section stores histories associated with each one of the addresses stored in the address section of BTB 202. Circuitry 200 also includes lookup/compare/update circuitry 204 and generate index circuitry 208. Generate index circuitry 208 generates an index into BTB 202 using some bits of a branch address encountered in a program whose behavior is to be predicted. The branch address is shown stored in register 210. Register 210 may be a dedicated register used for the purpose of storing a branch address or some other temporary storage location. When a branch address is encountered in the execution of a program, it is stored at 210. An index into BTB 202 is then created by generate index circuit 208 and the index is used by lookup/compare/update circuitry 204 to look up an address in BTB 202. There may be a many-to-one relationship between the number of addresses stored in BTB 202 and the index generated by a generate index circuitry 208. If a lookup operation performed by a lookup/compare/update circuitry 204 is successful, the address looked up is compared by lookup/compare/update circuitry 204 to the branch address stored in register 210. A lookup operation is successful if BTB 202 contains any entries previously recorded for the index. If a match is found as a result of the compare operation, a history stored in BTB 202 and associated with the branch address is used by predict circuitry 206 to predict the behavior of the branch instruction associated with the branch address in register 210. The behavior prediction is typically a prediction that the branch executed will actually be taken or not taken. The history is typically stored as several coded bits and the prediction is made using the bits according to one of several known algorithms, for example, the Yeh algorithm.

Results of the prediction operation performed by predict circuit 206 are passed to program control circuitry (not shown) which determines which instructions will be executed next. After the branch instruction has executed, it is evident whether or not the prediction was accurate. For example, instructions required to be executed by the branch as predicted must have been prefetched if the prediction was accurate.

As explained with respect to Table 1, prior art circuit 200 is vulnerable to context collisions, including those of the type illustrated in Table 1, in part because an index into BTB 202 is generated from only the branch address stored in register 210.

Figure 2:
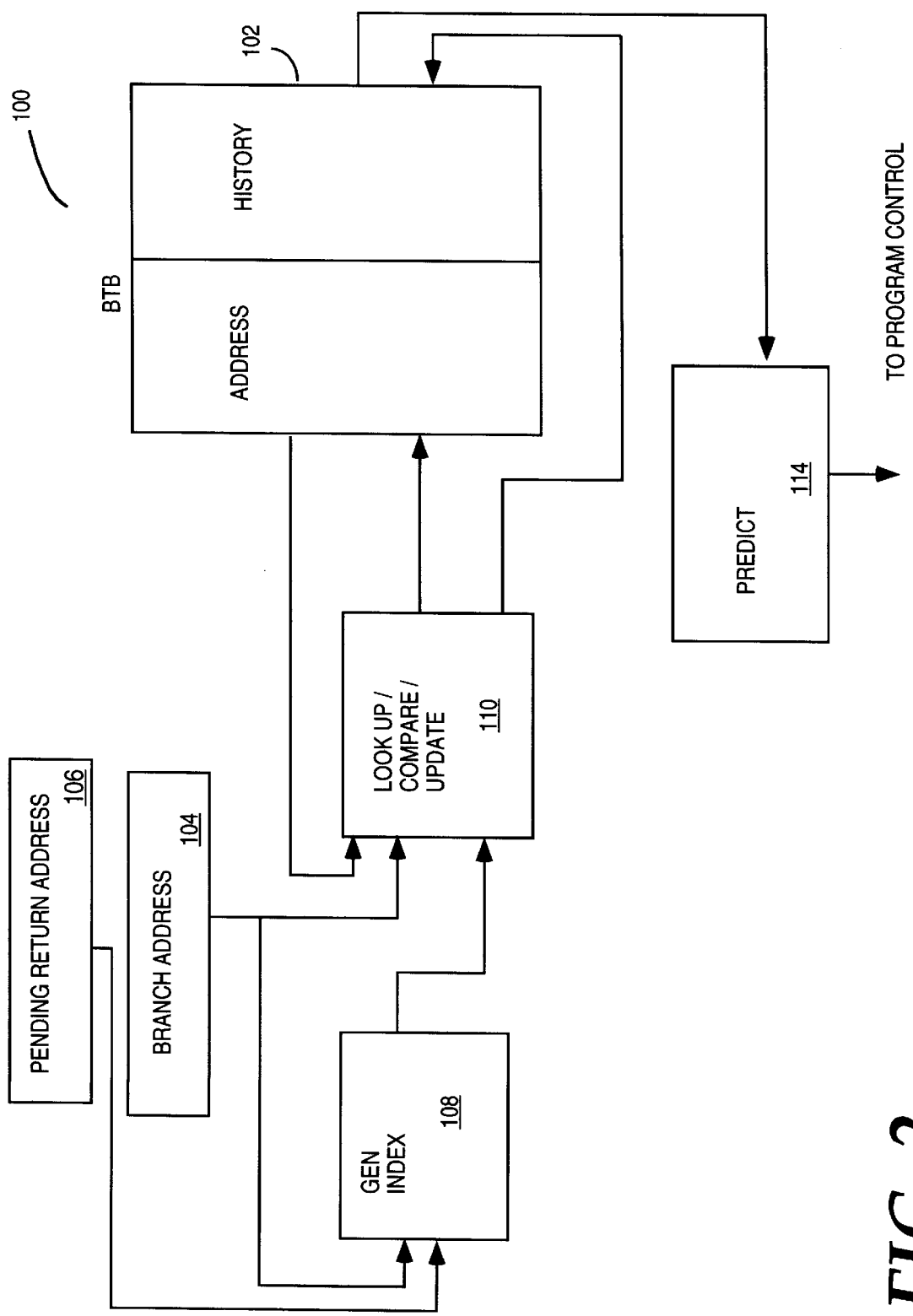
FIG. 2 is a block diagram of one embodiment of branch behavior prediction circuitry according to the present invention.

FIG. 2 is a block diagram of circuitry 100 according to one embodiment of the present invention. Circuitry 100 is used to improve branch prediction in a computer system executing application programs with branch instructions. Circuit 100 includes BTB 102, which includes an address section and a history section storing entire branch addresses and their associated histories, respectively. Circuitry 100 also includes pending return address register 106 which, in the embodiment of FIG. 2, stores one pending return address as indicated in a current function call. In this embodiment, a pending return address is stored in pending return address register 106 when a function is called and control is transferred to the address called. The pending return address is thus readily accessible. Control is returned to the pending return address when a return from the function called occurs. In other embodiments, a pending return address is pushed onto a stack and later popped off the stack when a return from the function call occurs. Circuitry 100 also includes branch address register 104 that stores a branch address associated with a current branch instruction. That is, register 104 stores a branch address whose behavior is to be predicted. Generate index circuitry 108 generates an index into BTB 102 using both the pending return address of register 106 and the branch address at register 104. Because, in this embodiment, the index into BTB 102 is generated using the pending return address of register 106 (as explained more fully below), the index for recording and using branch history information includes one level of the current call context, as opposed to prior methods and apparatus which reference no call context whatsoever.

In other embodiments, register 106 stores more than one pending return address, allowing more than one level of current call context to be included in the generation of an index into BTB 102. In other words, in a situation where a function is called from a function which has been called, reference could be made in a single index to the multiple call contexts. In such embodiments, however, it is typically necessary to increase the size of the BTB in order to realize performance improvement. This is because an affect of including more than one level of context is to increase the branch name space which, in turn, causes the complexity of the entries (e.g., the amount of information contained in the entries) into the BTB to increase. In order to effectively use the increased complexity, the storage area for the entries must increase.

In the embodiment of FIG. 2, the branch address used by generate index circuitry 108 is shown stored in register 104. In other embodiments the branch address is not necessarily stored in such a dedicated register. Lookup/compare/update circuitry 110 performs the various operations of BTB lookups using an index generated by generate index circuitry 108, comparison operations, and update operations to BTB 102. In this embodiment, the functions of lookup, compare and update are shown in one circuit block for convenience. In other embodiments circuitry performing lookup, comparison and updating performed by separate units with equal effectiveness.

An index generated by generate index circuitry 108 is input to lookup/compare/update circuitry 110 when a branch instruction is encountered in a currently executing application program. Lookup/compare/update circuitry 110 uses the index to perform a lookup in BTB 102. Because of design economies, as previously described, BTB 102 is relatively small. In this embodiment, BTB 102 stores sixty four (64) addresses with their associated histories. In this embodiment, the index generated by generate index circuitry 108 comprises $Log_2$ (number of BTB entries), or six bits. Therefore, in this embodiment, there may be a many-to-one relationship between entries in BTB 102 and the index generated by generate index circuitry 108. In other embodiments, BTB 102 can be larger or smaller. In other embodiments, the index generated by generate index circuitry 108 can comprise more or less bits than six. Design trade-offs that usually depend upon concerns specific to a particular system architecture typically dictate matters such as the amount of hardware that can be dedicated to a BTB.

In the case of a successful lookup operation, the BTB entry found by using the index is compared by lookup/compare/update circuitry 110 to the branch address stored in register 104, which is the address of a branch instruction currently executing. If a match is found, the history associated with the BTB entry is used by predict circuitry 114 to predict branch behavior, that is, whether the branch will be taken or not. The result of the predict operation performed by predict circuitry 114 is output to program control circuitry such that the program proceeds according to the prediction. Branch prediction based upon history stored in a BTB can be performed using any one of several known algorithms, for example, the Yeh algorithm.

On the other hand, if the compare operation indicates that there is no match between the BTB entry found using the index and the branch address stored at 104 then a lookup miss has occurred. In the case of a lookup miss, the program proceeds according to some predetermined alternative scheme. An example of a common alternative scheme is to always make the assumption that the branch will be taken in the case of a lookup miss.

In the case of a successful lookup followed by a prediction that a branch will be taken, it is evident whether or not the executing branch was accurately predicted or not. For example, if a branch is actually taken, instructions required to be executed by the branch will have been prefetched. If such instructions have not been prefetched, the branch has been mispredicted. In the case of a mispredicted branch, normal recovery occurs. Also, according to embodiments described herein, the actual branch behavior is recorded in BTB 202, augmenting any existing history according to the algorithm employed.

In the case of a successful lookup followed by an accurately predicted branch, the actual branch behavior is recorded in BTB 202 just as in the case of a misprediction.

Figure 3:
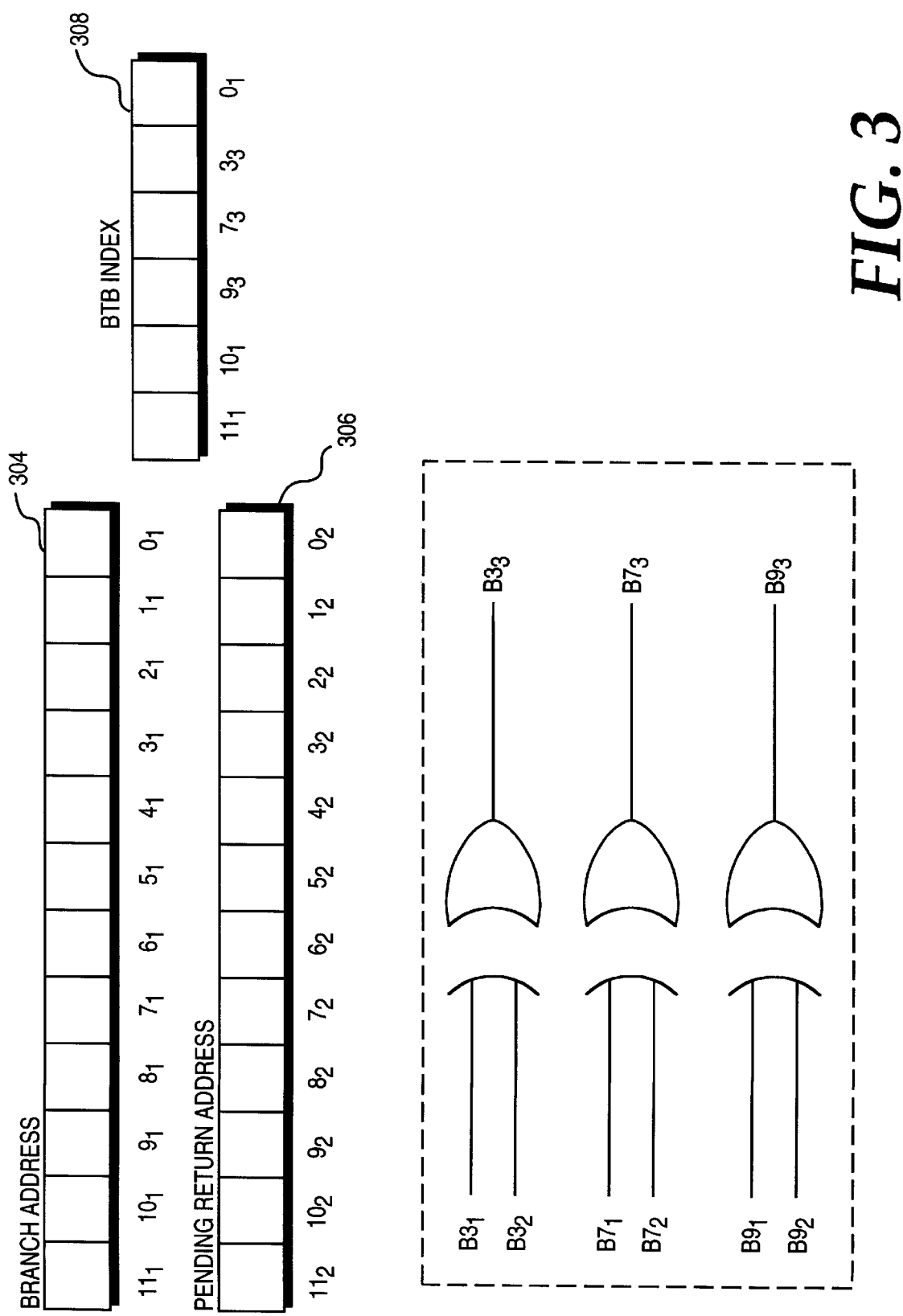
FIG. 3 is a diagram of a portion of circuitry for generating an index according to one embodiment of the present invention.

FIG. 3 is a diagram showing a portion 310 of generate index circuitry 108, branch address 304, pending return address 306, and BTB index 308 according to one embodiment of the present invention. Circuit portion 310 includes three XOR gates 312, 314, and 316. In this embodiment, XOR gates 312, 314 and 316 are used to combine selected bits of branch address 304 and pending return address 306. In other embodiments, bits from branch address 304 and pending return address 306 can be operated upon with different kinds of logic than XOR. An XOR operation is chosen for the present embodiment because the output of the XOR operation always depends upon states of both of the operands. This is not true of other logic operations, for example it is not true of an OR operation, in which one operand is a "don't care" in several instances. For this reason, the output of an XOR operation is more indicative of a character of both inputs, rather than just one. Other logic functions or combinations of logic functions could be used to generate combine bits of branch address 304 and pending return address 306.

As shown, XOR gate 312 performs an XOR operation on bit $b3_1$ and bit $b3_2$ from pending return address 306. The output of XOR gate 312 is bit $b3_3$. XOR gate 314 performs an XOR operation on bit $b7_1$ of branch address 304 and bit $b7_2$ of pending return address 306. The output of XOR gate 314 is bit $b7_3$. XOR gate 316 performs an XOR operation on bit $b9_1$ of branch address 304 and bit $b9_2$ of pending return address 306. The output of XOR gate 316 is bit $b9_3$. In this embodiment branch address 304 and pending return address 306 each comprise 12 bits. Twelve bits are shown herein for convenience, but addresses such as addresses 304 and 306 typically comprise at least 16 bits.

BTB index 308 includes $Log_2$ (number of BTB 102 entries), or six bits. BTB index 308 includes some bits from branch address 304 and some bits resulting from XOR operations performed by circuit portion 310. Specifically, in this embodiment, the six bits of BTB index 308 are bit $b0_1$, bit $b3_3$, bit $b7_3$, bit $b9_3$, bit $b10_1$, and bit $b11_1$. In other embodiments, a BTB index can comprise a greater or lesser number of bits and can be generated with different particular bits from the pending return address and the branch address.

Figure 4:
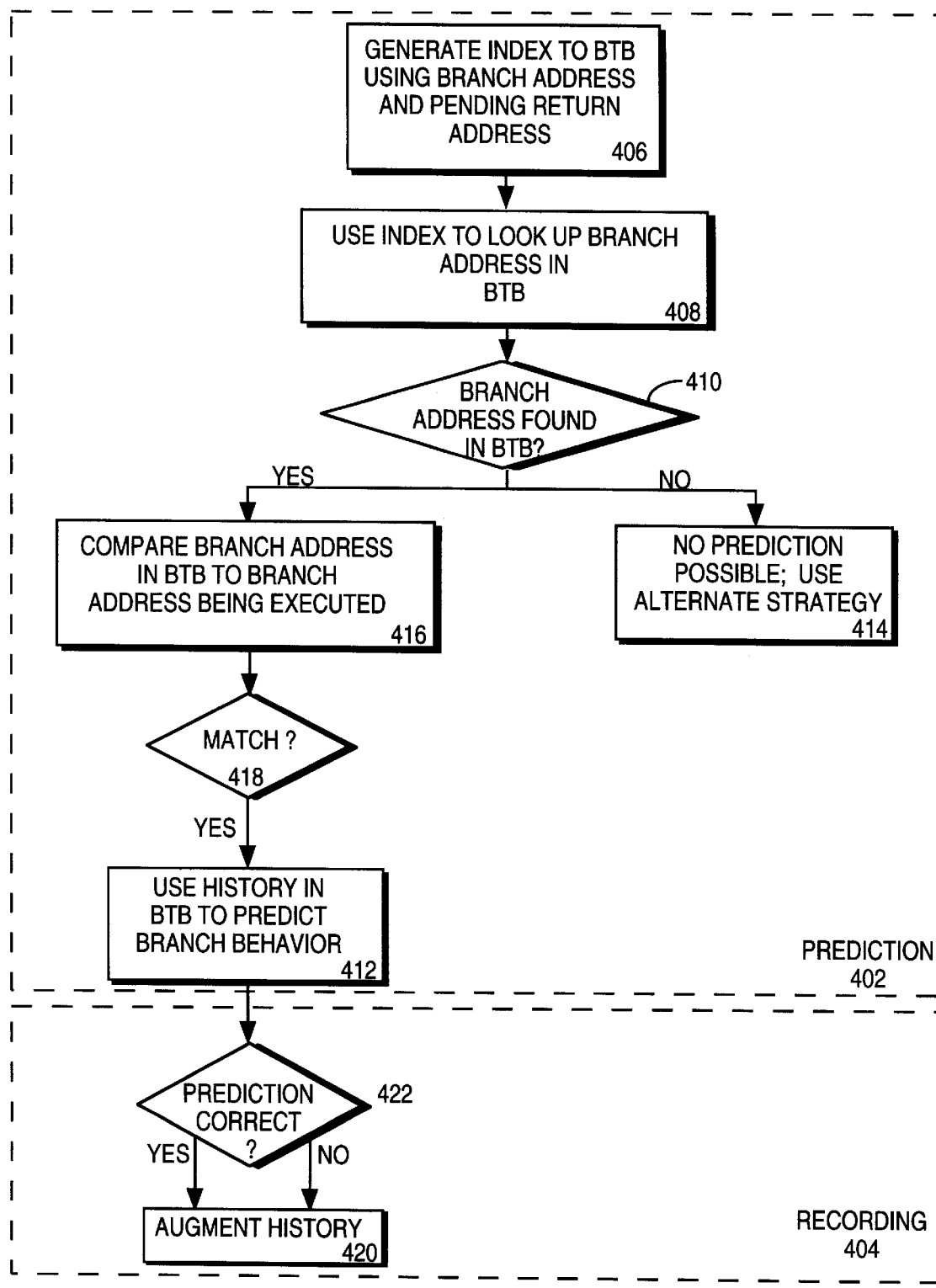
FIG. 4 is a flow diagram of a method of predicting branch behavior and executing branch instructions according to one embodiment of the present invention.

FIG. 4 is a flow diagram showing the operation of the present invention according to the embodiments described. The operation of the present invention as illustrated In FIG. 4 can be divided into two sections, prediction section 402 and recording section 404. At block 406 an index into the BTB is generated using the branch address and the pending return address as shown in FIG. 3. Next, at block 408 the index is used to look up a branch address stored in the BTB. Next, at block 410 it is determined whether a branch address was found in the BTB using the index. If no branch address is found in the BTB using the index, then at block 414 it is determined that no prediction is possible and a predetermined alternate strategy for continuing program execution is employed. If it is determined at block 410 that a branch address has been found in the BTB, the branch address found is compared to the branch address of the currently executing branch instruction (for example the branch address stored in register 104 of FIG. 2) at block 416. If it is determined at block 418 that the addresses are identical, the associated branch history is used at block 412 to predict the behavior of the branch according to a previously chosen algorithm.

It is determined whether the prediction was correct in block 422 according to known methods, for example by determining whether instructions required for the taken branch are prefetched. In both the case of an accurately predicted branch and a mispredicted branch, the behavior of the branch as observed is used to update, or augment, the history in BTB 102 according to the algorithm employed.

The present invention as described in FIG. 4 has been experimentally determined to significantly decrease the percentage of context collisions. For example, the context collision as described with respect to Table 1 would be entirely avoided with the use of the present invention. Referring to Table 1, if a single bit from the return address, for example 0x2000 (see line 33 of Table 1), is used in addition to the branch address bits to generate an index into the BTB, the two completely different branch behaviors illustrated in Table 1 would get two completely different history entries. Each separate entry can then potentially be predicted with 100% accuracy.

The present invention has been described with respect to a particular BTB size and an index with a particular number of bits. In the embodiments described, experimentation revealed a slight increase in lookup misses, but a large decrease in branch mispredictions using an index and BTB of same respective sizes as used with a typical prediction scheme. Other embodiments may employ a larger BTB, thereby compensating for the increase in address space caused by the inclusion of function context in the calculation of the index. An increase in BTB size may reduce the number of lookup misses while still realizing a substantial decrease in the number of branch mispredictions. It is also possible in other embodiments to increase the number of bits in the index. The index may also be generated in other ways than those shown in the described embodiments. For example, the index could be calculated by concatenating bits of the pending return address to bits of the branch address. This could be done to generate an index of the same number of bits or larger number of bits as that in the described embodiments.

Tests of described embodiments of the present invention have resulted in a reduction in branch mispredictions of up to 33% as well as an overall reduction in system cycle consumption of approximately 3%. In addition, with the present invention these benefits are realized with no recompilation and no increase in program size. The present invention is also effective for branches that are written in proprietary library code because the present invention as described is software independent.

Although the present invention has been described in terms of specific exemplary embodiments, various modifications and alterations may be made by those skilled in the art without departing from the spirit and scope of the invention as set forth in the following claims.

What is claimed is:

1. An apparatus for predicting branch behavior during execution of branch instructions in a computer program, comprising:

a branch table buffer (BTB) to store a plurality of branch addresses that are each generated during a function call and a plurality of branch histories associated with the branch addresses, the branch histories indicating whether or not an associated branch was previously taken; and circuitry coupled to the BTB to generate an index into the BTB for any type of branch using selected bits of a current branch address and at least one selected bit of a pending return address of a function call.

2. The apparatus of claim 1, wherein the circuitry to generate an index generates an index used to look up a branch address stored in the BTB.

3. The apparatus of claim 2, further comprising:

comparison circuitry coupled to the BTB to compare the stored branch address with a current branch address; and prediction circuitry coupled to the BTB to use a branch history associated with the stored branch address to predict branch behavior when a match is found.

4. The apparatus of claim 3, further comprising update circuitry to update the branch history when it is determined whether the prediction of branch behavior was accurate.

5. The apparatus of claim 4, further comprising a first storage device to store the current branch address.

6. The apparatus of claim 5, further comprising a second storage device to store the pending return address.

7. The apparatus of claim 2, wherein the circuitry to generate an index includes a plurality of logic gates that each output the result of an XOR operation performed on a selected bit from the current branch address and a selected bit from the pending return address associated with the current branch address.

8. The apparatus of claim 7, wherein the index comprises a plurality of bits output from the plurality of logic gates and a plurality of bits from the current branch address.

9. The apparatus of claim 8, wherein the index comprises a number of bits that is $Log_2$ (a number of entries in the BTB).

10. A method for predicting branch behavior in the execution of a computer program, comprising the steps of:

storing a plurality of branch addresses in a branch table buffer (BTB), wherein each branch address is generated during a function call;

storing a plurality of branch histories associated with the branch addresses in the branch table buffer (BTB), wherein the branch histories indicate whether or not an associated branch was previously taken; and generating an index into the BTB for any type of branch using selected bits of a current branch address and at least one selected bit of a pending return address of the function call.

11. The method of claim 10, further comprising the step of using the index to look up a branch address in the BTB.

12. The method of claim 11, further comprising the steps of:

if a branch address is found using the index, comparing the branch address found with the current branch address; and if the branch address found and the current branch address match, using a history stored in the BTB and associated with the current branch to predict branch behavior according to an algorithm.

13. The method of claim 12, further comprising the steps of:

if the branch address found and the current branch address do not match, following a predetermined alternate strategy.

14. The method of claim 13, wherein the predetermined strategy includes assuming that a branch of the current branch address will be taken.

15. The method of claim 14, wherein the predetermined strategy includes removing the branch address found and initializing the history.

16. The method of claim 15, further comprising the steps of:

determining whether the prediction of branch behavior was accurate;

if the prediction was accurate, updating the history; and if the prediction was not accurate, updating the history.

17. An apparatus for reducing a number of mispredicted branches in a processor that executes branch instructions of a computer program, comprising:

a branch table buffer (BTB) to store a plurality of branch addresses each associated with a branch instruction of the computer program, and a history associated with each of the plurality of branch addresses;

a first storage device to store a pending return address associated with a context of the branch instruction;

a second storage device to store the current branch address; and an index generation circuit coupled to the first and second storage devices to generate an index into the BTB for any type of branch using selected bits of the current branch address and at least one selected bit of the pending return address.

18. The apparatus of claim 17, further comprising:

lookup circuitry coupled to the index generation circuit and to the BTB to look up a branch address in the BTB using the index; and comparison circuitry coupled to the second storage device and the BTB to compare the current branch address in the second storage device and a branch address found in the BTB by the lookup circuitry.

19. The apparatus of claim 18, further comprising prediction circuitry coupled to the BTB to predict whether a branch associated with the branch address found will be taken using an associated history and a predetermined algorithm.

20. The apparatus of claim 19, further comprising update circuitry coupled to the comparison circuitry and to the BTB to update the associated history after it is determined whether the branch was taken.

* * * * *

UNITED STATES PATENT AND TRADEMARK OFFICE
CERTIFICATE OF CORRECTION

PATENT NO.   : 5,964,870
DATED        : October 12, 1999
INVENTOR(S)  : Maliszewski It is certified that error appears in the above-identified patent and that said Letters Patent is hereby corrected as shown below:

In column 4, at line 33, delete "ho" and replace with --no--.

Signed and Sealed this

Tenth Day of April, 2001

Attest:

NICHOLAS P. GODICI

Attesting Officer    Acting Director of the United States Patent and Trademark Office